US011066881B2

(12) United States Patent
Calva, Sr.

(10) Patent No.: US 11,066,881 B2
(45) Date of Patent: Jul. 20, 2021

(54) METHOD AND COMPOSITION FOR STABILIZATION OF DRILL CUTTINGS

(71) Applicant: Warren Transport, Inc., Billings, MT (US)

(72) Inventor: Christopher Calva, Sr., Williston, ND (US)

(*) Notice: Subject to any disclaimer, the term of this patent is extended or adjusted under 35 U.S.C. 154(b) by 0 days.

(21) Appl. No.: 16/800,984

(22) Filed: Feb. 25, 2020

(65) Prior Publication Data

US 2020/0208478 A1 Jul. 2, 2020

Related U.S. Application Data

(63) Continuation-in-part of application No. 16/051,178, filed on Jul. 31, 2018, now Pat. No. 10,570,681, which is a continuation of application No. 15/445,504, filed on Feb. 28, 2017, now abandoned.

(60) Provisional application No. 62/395,540, filed on Sep. 16, 2016.

(51) Int. Cl.
| | |
|---|---|
| *E21B 21/06* | (2006.01) |
| *E21B 41/00* | (2006.01) |
| *C04B 28/02* | (2006.01) |
| *C04B 14/28* | (2006.01) |
| *C04B 111/00* | (2006.01) |

(52) U.S. Cl.
CPC ............ *E21B 21/066* (2013.01); *C04B 14/28* (2013.01); *C04B 28/021* (2013.01); *E21B 41/005* (2013.01); *C04B 2111/00767* (2013.01); *Y02W 30/91* (2015.05)

(58) Field of Classification Search
CPC .................. C04B 14/28; C04B 28/021; C04B 2111/00767; C04B 14/104; C04B 14/368; C04B 18/049; C04B 18/12; C04B 18/162; C04B 20/04; C04B 28/10; E21B 21/066; E21B 41/005; Y02W 30/91
See application file for complete search history.

(56) References Cited

U.S. PATENT DOCUMENTS

| | | | |
|---|---|---|---|
| 2,034,519 A | * | 3/1936 | Larson |
| 2,042,096 A | * | 5/1936 | Greider |
| 4,501,618 A | | 2/1985 | Gebhard et al. |
| 4,615,809 A | | 10/1986 | King |
| 4,629,509 A | | 12/1986 | Ohara et al. |
| 4,651,656 A | | 3/1987 | Wallner et al. |
| 4,761,182 A | | 8/1988 | Whitescarver et al. |
| 4,840,671 A | | 6/1989 | Lynn et al. |
| 4,853,208 A | | 8/1989 | Reimers et al. |
| 4,888,054 A | | 12/1989 | Pond |
| 4,900,360 A | | 2/1990 | Whitescarver et al. |
| 4,917,733 A | | 4/1990 | Hansen |
| 5,106,510 A | | 4/1992 | Rieber |
| 5,143,481 A | | 9/1992 | Schumacher et al. |
| 5,207,910 A | | 5/1993 | Rieber |
| 5,211,750 A | | 5/1993 | Smith et al. |
| 5,229,097 A | | 7/1993 | Roeder et al. |
| 5,252,127 A | | 10/1993 | Pichat |
| 5,256,197 A | | 10/1993 | Smith |
| 5,259,697 A | | 11/1993 | Allen et al. |
| 5,304,710 A | | 4/1994 | Kigel et al. |
| 5,342,442 A | | 8/1994 | Nechvatal et al. |
| RE34,775 E | | 11/1994 | Nechvatal et al. |
| 5,380,351 A | | 1/1995 | Fisher |
| 5,435,843 A | | 7/1995 | Roy et al. |
| 5,500,044 A | | 3/1996 | Meade et al. |
| 5,516,974 A | | 5/1996 | Sasae et al. |
| 5,538,552 A | | 7/1996 | Osing et al. |
| 5,550,314 A | | 8/1996 | Laughlin et al. |
| 5,584,792 A | | 12/1996 | Webster |
| 5,607,505 A | | 3/1997 | Osing et al. |
| 5,626,664 A | | 5/1997 | Osing et al. |
| 5,651,895 A | | 7/1997 | Gordon |
| 5,653,795 A | * | 8/1997 | Brown ...................... C09C 1/02 106/416 |
| 5,669,969 A | | 9/1997 | Meade et al. |
| 5,714,002 A | | 2/1998 | Styron |
| 5,714,003 A | | 2/1998 | Styron |
| 5,997,632 A | | 12/1999 | Styron |
| 6,015,498 A | | 1/2000 | Gleizes |
| 6,132,355 A | | 10/2000 | Derie |
| 6,251,178 B1 | | 6/2001 | Styron |
| 6,337,058 B1 | | 1/2002 | Williams et al. |
| 6,482,258 B2 | | 11/2002 | Styron |
| 7,655,088 B2 | | 2/2010 | Bethani |
| 7,704,317 B2 | | 4/2010 | Bethani |
| 7,780,781 B2 | | 8/2010 | Bethani |
| 8,349,070 B2 | | 1/2013 | Bethani |
| 8,512,468 B2 | | 8/2013 | Allouche et al. |
| 8,562,735 B2 | | 10/2013 | Allouche et al. |
| 8,873,033 B1 | | 10/2014 | Allouche et al. |
| 9,207,155 B1 | | 12/2015 | Allouche et al. |
| 9,290,416 B1 | | 3/2016 | Allouche et al. |
| 2008/0210134 A1 | | 9/2008 | Hanks |
| 2014/0072368 A1 | | 3/2014 | Hemmings |
| 2018/0079685 A1 | | 3/2018 | Calva, Sr. |
| 2018/0265370 A1 | | 9/2018 | Paynter |

FOREIGN PATENT DOCUMENTS

| | | | |
|---|---|---|---|
| CN | 105273462 A | * | 1/2016 |
| WO | 8301443 A1 | | 4/1983 |

OTHER PUBLICATIONS

Saurashtra Solid Industries Pvt. Ltd., "Food Grade Precipitated Calcium Carbonate", Sep. 2008, retrieved from Archive.org on Feb. 21, 2018, https://web.archive.org/web/20080805045111/http:www.saurashtrasolid.com.

* cited by examiner

*Primary Examiner* — Anthony J Green
(74) *Attorney, Agent, or Firm* — Antoinette M. Tease

(57) ABSTRACT

A method and composition for stabilizing drill cuttings commences by providing precipitated calcium carbonate (PCC). The PCC is dried to a moisture level of about 10% or less. Drying by heat not to exceed 400° F. is preferred to prevent changes in the PCC. The dried PCC is blended with kiln dust to compose a generally uniform admixture. In the admixture, the kiln dust is not to exceed 40%. The admixture is introduced to the drill cuttings to initiate a nucleation reaction within the commixture of drill cuttings and the admixture.

16 Claims, 4 Drawing Sheets

| Drill Cuttings Moisture Content | PCC and Kiln Dust By Percentage | PCC and Kiln Dust By Volume | Oil Content in Drill Cuttings % Crude Mix | PCC and Kiln Dust By Percentage | PCC and Kiln Dust By Volume |
|---|---|---|---|---|---|
| 10% | 4% | .92 lbs per Gal | 10% | 3.5% | 1.8 lbs per Gal |
| 20% | 6% | 1.3 lbs per Gal | 20% | 7.0% | 2.0 lbs per Gal |
| 30% | 8% | 1.5 lbs per Gal | 30% | 9.5% | 2.8 lbs per Gal |
| 40% | 10% | 1.8 lbs per Gal | 40% | 12.5% | 3.1 lbs per Gal |
| 50% | 12% | 2.2 lbs per Gal | 50% | 15% | 3.6 lbs per Gal |
| 60% | 14% | 2.4 lbs per Gal | 60% | 17.5% | 3.8 lbs per Gal |
| 70% | 16% | 3.0 lbs per Gal | 70% | 20.4% | 4.2 lbs per Gal |
| 80% | 18% | 3.6 lbs per Gal | 80% | 23.2% | 4.7 lbs per Gal |

FIGURE 3
(Table 1)

| Drill Cuttings Moisture Content | PCC and Kiln Dust Ratio By Percentage | Total Treated Volume (PCC and Kiln Dust Plus Water) bbls per/ho | Oil Content in Drill Cuttings % Crude Mix | PCC and Kiln Dust Ratio By Percentage | Total Treated Volume (PCC and Kiln Dust Plus Crude Oil) bbls per/ho |
|---|---|---|---|---|---|
| 10% | 90% PCC 10% High Cal | 51.75 | 10% | 90% PCC 10% High Cal | 26.45 |
| 20% | 90% PCC 10% High Cal | 36.63 | 20% | 90% PCC 10% High Cal | 23.80 |
| 30% | 90% PCC 10% High Cal | 31.74 | 30% | 80% PCC 20% High Cal | 17.00 |
| 40% | 80% PCC 20% High Cal | 26.45 | 40% | 80% PCC 20% High Cal | 15.36 |
| 50% | 80% PCC 20% High Cal | 21.64 | 50% | 70% PCC 30% High Cal | 13.22 |
| 60% | 70% PCC 30% High Cal | 19.84 | 60% | 70% PCC 30% High Cal | 12.53 |
| 70% | 70% PCC 30% High Cal | 15.87 | 70% (plus) | 60% PCC 40% High Cal | 11.33 |

FIGURE 4
(Table 2)

METHOD AND COMPOSITION FOR STABILIZATION OF DRILL CUTTINGS

PRIORITY CLAIM

This application is a continuing application and claims its priority as a continuation in part of the Utility application Ser. No. 16/051,178 filed on Jul. 31, 2018, which, on Feb. 25, 2020 matured into U.S. Pat. No. 10,570,681, and is entitled, "Method and composition for stabilization of drill cuttings," and which in turn claims priority as a continuation of Utility application Ser. No. 15/445,504 filed on Feb. 28, 2017, since abandoned, which in turn claims priority from and entirely incorporates the Provisional Application filed as Ser. No. 62/395,540 on Sep. 16, 2016 by Christopher Calva Sr.

FIELD OF THE INVENTION

The invention exists in the field of stabilization of drill cuttings, specifically in nonpozzolanic stabilization.

BACKGROUND OF THE INVENTION

Drilling a natural gas or oil well involves the use of fluid (called drilling mud) or compressed air (air drilling) to aid in the process of drilling a borehole into the earth. Drilling mud is necessary in drilling because it cools and lubricates the drill bit, helps stabilize the well bore during drilling and keeps fluids in the formation from entering the borehole.

Drilling mud also is used to carry rock and soil (called drill cuttings) excavated by the drill bit up to the surface. At the surface, the drilling mud is separated from the drill cuttings. Drilling mud is valuable to the drill operator and is recovered so that it can be used again. Drill cuttings are produced as the rock is broken by the drill bit advancing through the rock or soil; the cuttings are usually carried to the surface by drilling fluid circulating up from the drill bit. Drill cuttings can be separated from liquid drilling fluid by shale shakers, by centrifuges, or by cyclone separators, the latter also being effective for air drilling. In cable-tool drilling, the drill cuttings are periodically bailed out of the bottom of the hole. In auger drilling, cuttings are carried to the surface on the auger flights.

The cuttings separated from the mud at the shale shakers may be coated with so much mud that they are unsuitable for the next reuse or disposal step or are difficult to handle or transport. Constituents of the cuttings or the mud coating them (e.g., oil, metals) may leach from the waste, making them unsuitable for land application or burial as a means for disposal. Methods for placing these constituent materials (contaminants) beyond the reach of a percolating liquid that might leach the materials into the surrounding soil or into the water table include solidification and stabilization.

Because of environmental concerns, the North Dakota Health and Energy Commission no longer allows open reserve pits at or near well sites once the sites are no longer used in the North Dakota oil and gas industry. The need to process, transport and dispose of drill cuttings however, remain an important and expensive aspect of the extraction of oil and gas.

Solidification involves the processes that encapsulate contaminated material to form a solid material and restricts contaminant migration by decreasing the surface area exposed to leaching and/or by coating the contaminated material with low permeability materials. Solidification is accomplished by mechanical processes, which mix the contaminated material with one or more reagents. Solidification does not necessarily involve a chemical interaction between the wastes and the solidifying reagents but may mechanically bind the waste into the monolith. Contaminant migration is restricted by vastly decreasing the surface area exposed to leaching or by isolating the wastes within an impervious capsule. By current convention, solidification is the addition of absorbents such as soil, fly ash, kiln dust, cement, clays or sawdust to the drilling waste. The solidified product will have improved properties such as strength, compressibility and a reduced permeability.

"Stabilization" involves the processes where chemical reactions occur between the reagents and contaminated material to reduce the leachability of contaminated material into a stable insoluble form. Stabilization chemically binds free liquids and immobilizes contaminated materials or reduces their solubility through a chemical reaction. The physical nature of the contaminated material may or may not be changed significantly by this process. Stabilization refers to those techniques that reduce the hazard potential of a waste by converting the contaminants into their least soluble, mobile, or toxic form. The physical nature and handling characteristics of the waste are not necessarily changed by stabilization. It is an adsorption process whereby contaminants are electrochemically bonded to the stabilizing agents. Contaminants that are stabilized within the matrix are less likely to be released into the environment. This process is particularly relevant to the stabilization of heavy metals and oils that would otherwise be rapidly available to the environment through leaching.

To isolate the reactive portions of drill cuttings from the environment, there is, then, an ongoing need to solidify on-site reserve pit fluids (drill cuttings, mud and other contaminants that are naturally occurring or part of the drilling process) that are generated directly from exploration (drilling). During exploration, a Drilling Mud Engineer will regularly dispose of drilling mud materials which have been down hole when, in the engineer's judgment such materials are too contaminated to continue to be useful. At such a point, these materials are placed in a reserve pit awaiting further processing for disposal.

Disposal wells represent a second significant point in the waste stream process for which a solidification need exists. The waste received at these disposal wells vary in its liquid content, with some waste being completely liquid, and some mixed with other constituents, including oil, mud and other material. The current process includes separating the latent oil that remains in the production water before any other processing occurs. This oil is then sold into the larger market. The remaining liquid requires further processing. It is currently common industry practice to mix this waste water with one of several cementitious products, to stabilize that waste, rendering it inert in its environment. Once inert, the engineer injects drilling wastes into underground formations for permanent disposal. Slurry injection technology involves grinding or processing solids into small particles, then mixing them with water or some other liquid to make a slurry. The slurry is then injected into an underground formation at pressures high enough to fracture the rock.

Currently, the predominant product used to stabilize the waste is fly ash. Fly ash is a coal combustion by-product, and comprises fine particles that are driven out of the boiler with the flue gases. Ash that falls in the bottom of the boiler is called bottom ash. Fly ash is generally captured by electrostatic precipitators or other particle filtration equipment before the flue gases reach the chimneys of coal-fired power plants. Depending upon the source and makeup of the coal being burned, the components of fly ash vary considerably, but all fly ash includes substantial amounts of silicon dioxide ($SiO_2$) (both amorphous and crystalline), aluminum oxide ($Al_2O_3$) and calcium oxide (CaO), the main mineral compounds in coal-bearing rock strata. Proportions of these compounds in the fly ash depend upon the specific coal bed makeup, but may include one or more of the following elements or substances found in trace concentrations (up to hundreds ppm): arsenic, beryllium, boron, cadmium, chromium, hexavalent chromium, cobalt, lead, manganese, mercury, molybdenum, selenium, strontium, thallium, and vanadium, along with very small concentrations of dioxins and PAH compounds. As stated above, fly ash, though a by-product of coal combustion and readily available where coal is burned, is extremely expensive to transport.

Historically, fly ash has been used most frequently as a solidification/stabilization additive for treating drill cuttings and other types of wet solids. Drill cuttings composed of drilling fluids (fresh water and oil-based liquid), dirt, clay and rock are created as the hole is drilled deeper and deeper. These materials are solidified two ways. One, as they come off the rig, they are mixed with fly ash and disposed of in the solids pit on the pad site. Second, the solid and liquid cuttings are hauled off-site in closed top containers. Once the material reaches a landfill, it is solidified with fly ash. Fly ash is the leading drying and solidification agent in, for example, the Bakken oil fields. It is widely used as it is capable of solidifying into cement and has hygroscopic (ability to absorb water) properties.

Fly ash is produced in boilers burning pulverized coal and is removed from the boiler exhaust gases by electrostatic precipitators, baghouses, or scrubber systems. Fly ash is a heterogeneous mixture of silicon, iron, and aluminum oxides, carbon, and calcium oxide. Because it is collected by separating the solids from the gasses that make up the exhaust; fly ash particles are typically smaller than 200 μm in diameter and the mean particle diameter for fly ash is often less than 50 μm.

U.S. Pat. Nos. 4,274,880 and 4,226,630 disclose means for disposing of hazardous liquid wastes in combination with fly ash. These both exploit the pozzolanic reaction which occurs when fly ash is introduced into a waste water slurry. In addition, neither of these patents disclose or suggest that such a cementitious mixture may be combined to dispose of landfill leachate. Specifically, U.S. Pat. No. 4,226,630 is directed towards the disposal of water-borne heavy metal sludge produced in metal processing and refining plants, by combining the sludge with a very specific type of fly ash formed through the combustion of sub-bituminous coal which is only mined in the "Powder River Basin" of Gillette, Wyo. U.S. Pat. No. 4,432,800 is directed towards the treatment of kiln dust used in pozzolanic reactions with calcium oxide, calcium hydroxide or sodium hydroxide. The treated kiln dust is used with a pozzolan such as fly ash and a filler to produce a durable mass. There is no disclosure or suggestion in U.S. Pat. No. 4,432,800 for using such a mixture for the stabilization of drill cuttings.

Three critical factors drive supply and demand in the fly ash market and are, therefore, determinative of price. The first of these is the trend marked by the generally declining quality of fly ash. Much of the decline can legitimately be blamed on government regulation requiring NOx control. To reduce the presence of NOx, lower temperature burners are used which, because of their flame geometry and the lower temperature, pass much more unburned carbon to the resulting fly ash. The presence of more unburned carbon in fly ash can significantly diminish the beneficial application as either of a solidifying additive or in concrete mixtures.

The second factor is value. The industry is beginning to realize the substantial value that fly ash has as a cement additive. Because fly ash improves the workability and pumpability of concrete, increases its density, increases its ultimate strength and improves its resistance to chlorine and sulfate attack more and more of the available fly ash is consumed by the concrete industry. Chemically, fly ash reacts with excess portlandite in Portland cement making it unavailable to react with sulfate or carbon dioxide thereby greatly shrinking the size of pores present in the concrete. It also displaces its equivalent weight in cement costing $70-$80 per ton. The price of high quality fly ash pozzolan is beginning to rise in areas where there are shortages and prices of $25-$30 per ton are not uncommon.

The third and most important market factor has to do with the inherent immobility of the resource. Fly ash is consumed and marketed regionally. Because fly ash is a bulky, heavy material, transportation to needy markets is economically unfeasible. For example, it costs between $0.10 and $0.13/ton/mile to transport fly ash by pneumatically loaded trailer truck. Thus, there is a limit as to how far it can be economical at such prices. While fly ash can travel less expensively by either rail or barge, loadout facilities and rail car availability can provide serious complications. When the variations of the building industry's activities and subsequent demand are added in, it is not at all difficult to understand how regional shortages of quality fly ash occur.

To substitute for fly ash at sites distant from coal combustion, various wellhead engineers have used cement, wood chips left from lumber production, or quick lime. Because each of these products has distinct uses, they have not been economically attractive as a solidifying agent. Where available, the most frequently used product is quick lime.

Calcium oxide (CaO), commonly known as quicklime or burnt lime, is a widely used chemical compound. It is a white, caustic, alkaline, crystalline solid at room temperature. The broadly used term "lime" connotes calcium-containing inorganic materials, in which carbonates, oxides and hydroxides of calcium, silicon, magnesium, aluminum, and iron predominate. By contrast, "quicklime" specifically applies to the single chemical compound calcium oxide. Calcium oxide which survives processing without reacting in building products such as cement is called free lime. Quicklime is relatively inexpensive. Both it and a chemical derivative (calcium hydroxide, of which quicklime is the base anhydride) are, however, important commodity chemicals. It has the facility for the drying of soils but, by itself, is not suitable for stabilization.

Even in the petroleum industry itself, quicklime has a role: water detection pastes contain a mix of calcium oxide and phenolphthalein. Should this paste come into contact with water in a fuel storage tank, the CaO reacts with the water to form calcium hydroxide. Calcium hydroxide has a high enough pH to turn the phenolphthalein a vivid purplish-pink color, thus indicating the presence of water in the tank.

According to the American Petroleum Institute (API), it is estimated that approximately 1.21 barrels of total drilling wastes are generated for every foot drilled at a well. From reviewing actual drilling logs from a standard horizontal well, that exemplary well being drilled to at a minimum depth of 11,000 feet down-hole, there are between 6 to 8 truck-loads of drying agents currently required. A truck load is equal to 22 tons of material (the term "Super Sack™" is used interchangeably with the measure "ton" because of the extremely common use of Super Sacks™ to transport such materials in one-ton increments). Thus, a single 11,000 ft. well would therefore require approximately 154 Super Sacks™ of drying ingredient.

According to the recent production data available from the Department of Mineral Resources (January 2016), there are currently approximately 1,200 wells waiting for completion, plus 12,818 wells currently producing in North Dakota. In April 2016, a large oil field trans-load facility in Williston, N. Dak., Red River Supply, transported 20 million pounds of cement and lime each week during Q1, 2016. In rough approximation, half of that amount was used for down hole cementing. Even as expressed in Super Sacks™, the demand is stunning.

Recently, slickening agents have been employed to enable more maneuvering of the drill heads in search of oil. These slickening agents raise the pH of the borehole environment significantly and, in order to counteract that rise in pH, stabilizing agents must be able to supplant that rise to be effective. These slickening agents tend to react with oxides of iron in the surrounding soil. These leeching oxides tend to inhibit the actions of the stabilizing agents such as fly ash. A further stabilization of the cuttings in the presence of these slickening agents requires a distinct agent from the conventionally used fly ash.

What is needed in the art is a method and composition to provide a lower cost alternative to fly ash as a solidifying agent even in light of slickening agents that might be employed within the borehole.

SUMMARY OF THE INVENTION

A method is set forth for solidifying oil field waste to include a process of creating a cation of that waste that is handled as a semi-solid mass for transport. Importantly, from an economic standpoint, the principle ingredient is a conventionally discarded by-product precipitated calcium carbonate (PCC) from the refining of sugar. The result of the solidification process is a colloid allowing it to be handled by conventional and familiar means.

A method and composition for stabilizing drill cuttings commences by providing (PCC). The PCC is dried to a moisture level of about 10% or less. Drying by heat not to exceed 400° F. is preferred to prevent changes in the PCC. The dried PCC is blended with kiln dust to compose a generally uniform admixture. In the admixture, the kiln dust is not to exceed 40%. The admixture is introduced to the drill cuttings to initiate a nucleation reaction within the commixture of drill cuttings and the admixture.

In a further embodiment of the invention, concentrated application of hydrated lime, also known as calcium hydroxide $\{Ca(OH)2\}$. Calcium oxide is stoichiometrically reacted with water in a controlled process to form a hydrated lime product that has the consistency of a fine white powder containing less than 1% residual moisture. By introducing the hydrated lime during the drying process shortening the necessary screening action making the blending a more efficient and cost effective way to accomplish the finished product. In the selected embodiment the resulting product treats proves to eliminate the need or, in fact, the desire for fly ash and allows the final product to become up to 78% reactive for reuse. In using the hydrated lime, experiments have shown that 640 pounds less product of this embodiment (i.e. 32% less by volume) to achieve the equivalent on-site hydration results as by the earlier embodiment using an American short ton (2,000 lbs.) of fly-ash. The use of hydrated lime proves to be a presently preferred embodiment of the invention.

BRIEF DESCRIPTION OF THE DRAWINGS

Preferred and alternative examples of the present invention are described in detail below with reference to the following drawings:

FIG. 3 is a table for determining a suitable ratio of kiln dust to precipitated calcium carbonate setting forth the presently preferred embodiment of the invention; and FIG. 4 is a table for determining a suitable volume of the admixture to introduce to the drill cuttings to stabilize the cuttings for disposal.

DETAILED DESCRIPTION OF THE PREFERRED EMBODIMENT

Figure 1:
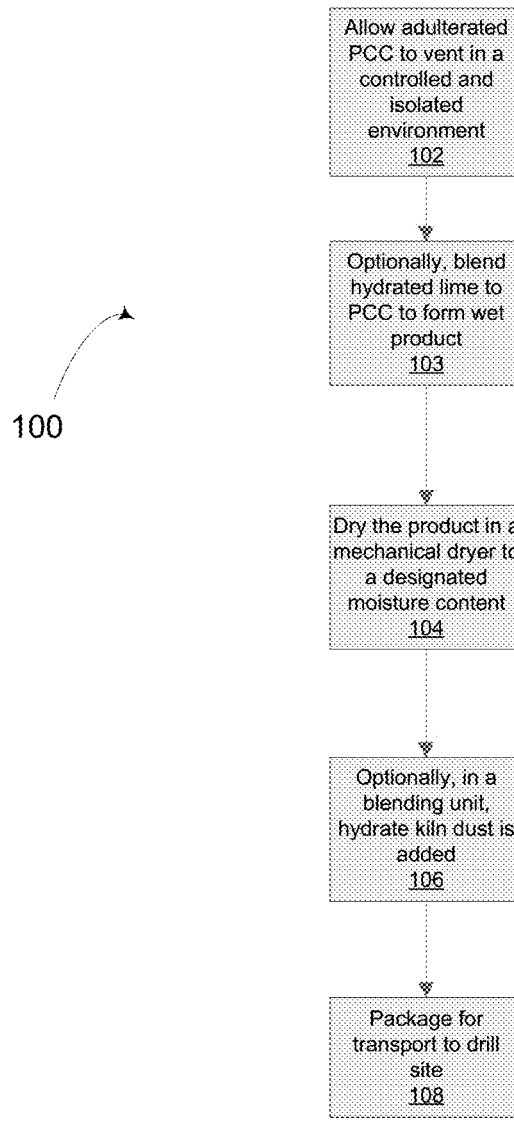
FIG. 1 depicts a flowchart setting forth a method for composing an admixture of precipitated calcium carbonate and kiln dust to be used for stabilizing drill cuttings.
Figure 2:
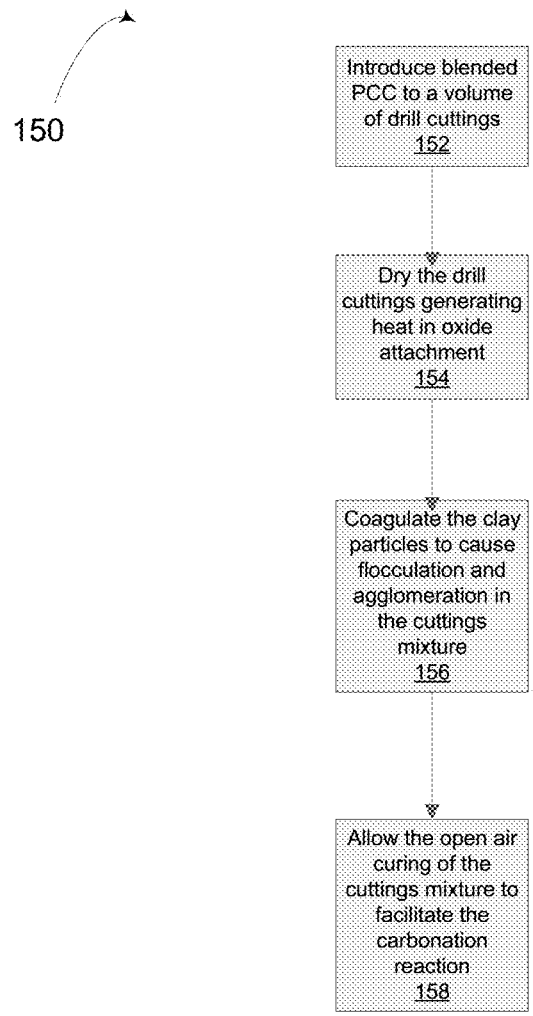
FIG. 2 is a method for a nucleation reaction to stabilize drill cuttings using the admixture of precipitated calcium carbonate and kiln dust.

Historically, cement, fly ash, lime, and calcium oxide have been used most frequently as solidification/stabilization additives for treating drill cuttings and other types of wet solids. A solidified waste is an amorphous solid at least partially saturated with water. It consists of one or more solid phases, entrapped air in the form of air voids, and a liquid phase; all are in chemical equilibrium or close to it. Ideally, any product used as a substitute for fly ash will be used in a similar fashion in order to solidify or to stabilize the various pollutants in the waste water.

Before discussing the process, it is extremely important to discuss the principal reagent that enables the stabilization or solidification of the wet waste. Spent lime (more technically known as Precipitated Calcium Carbonate, or PCC) does not occur in nature. PCC is a by-product of the sugar beet factories during the sugar purification process.

PCC is produced by exposing high purity calcium carbonate limestone to high temperatures (1850° F.) to form two components, calcium oxide and carbon dioxide. These two components are inserted into the thick juice during sugar beet processing, which are then reformed back into calcium carbonate. When the calcium carbonate reforms it affixes and adsorbs many of the impurities in the juice and precipitates out from the juice. As the calcium carbonate reforms, being insoluble in water, it precipitates out. The precipitate forms a solid lime product that when separated out, leaves behind the thin juice from which sugar is extracted.

After use in the refinery, the adulterated PCC is placed in vast settling ponds and scooped into piles as it dries. This PCC can be recalcined to calcium oxide (quicklime) by again heating it to about 800-900° C. for periods of about 10 to 30 minutes, but generally this process is more expensive than the purchase of fresh hydrated lime, and so the adulterated PCC by-product is considered as waste. Most often, huge piles of PCC are simply left in heaps on the ground. As processing continues, these waste piles continue to grow.

Because PCC is a by-product of the refinement process of sugar beets with no real downstream use, the precipitate has been stockpiled in vast acreage at sugar beet processing facilities. To date, the principal means of disposal has been to broadcast it over fields as a limited way to enhance mineral content in soils used for agriculture. Stockpiling the waste PCC has not caused any hazard to land or to the water tables where it is stockpiles so there has not been an immediate need to find further means for disposal. But, to use the by-product PCC to ameliorate the environmental impact of drilling wells is a synergistic solution to two problems.

PCC does not occur naturally though it is a crystalline form of elements commonly found in nature. As such, it presents little further threat to the environment. It is not highly reactive and upon precipitation, is easily separated from the impurities it has entrained in the refinement process. It is derived from the "Carbonatation Process," which involves the introduction of limewaters (milk of lime—calcium hydroxide suspension) and carbon dioxide—mixed enriched gas that is found in the "raw juice". Upon reaction, these reagents form calcium carbonate and, thus, precipitate impurities that are then removed. Left in open areas to dry out, the PCC is a dusty white powder, easily mechanically separated from the precipitated impurities.

By overview, one embodiment of the processing of PCC is initiated by transporting the adulterated PCC to an enclosure free from exposure to ground soils and contaminants. The adulterated PCC is allowed to vent moisture naturally through carbonation drying the product for optimum processing. After this initial evaporative drying, the material is placed into a mechanical dryer for further drying. Mechanical drying accelerates production in the presently preferred embodiment. Most economically, the mechanical dryer can be used to dry the material to optimal moisture content for storage. The mechanical dryer is used conventionally, though little of no heat is provided beyond that of the ambient atmosphere. At high heat, the PCC is chemically changed to a distinct calcium compound so the heat used to dry the material is limited to temperatures not to exceed 400° F. for any period that might cause this chemical reaction. The still raw (PCC) to dried to reduce moisture to no more than 10%. Once the PCC reaches this 10% moisture level, mechanical drying is practical. A mechanically driven unit further dries and blends the PCC with hydrated kiln dust in a determined ratio, which allows for the now dryer material to be moved by belt conveyor and packaged (in bulk form) to its eventual destination, primarily by bulk bag.

The purity of PCC as a by-product of sugar refining makes PCC a stand-out candidate for solidification. When compared to conventional materials, PCC yields a more inert solidified mass. Consider, for example, that because fly ash is a product of coal combustion, it contains mercury which can leech into the soil to contaminate the water table. Similarly, cement also includes mercury. Because quicklime is an oxide it "craves" moisture and when introduced into well cuttings, generates exothermically released heat in excess of 180 degrees, making it difficult to handle safely. Given the resulting pH of the slurry, the question of propriety for down-well disposal is hotly debated. PCC has neither leeching or handling issues that arise in use as a solidifying agent.

PCC is not merely a distinct cement and, in this context, not a cement at all. Cements in general harden by reaction, not by drying, the reaction known as the pozzolanic effect. The pozzolanic reaction is the chemical reaction that occurs in Portland cement upon the addition of pozzolans. The pozzolanic reaction converts a silica-rich precursor with no cementing properties, to a calcium silicate, with good cementing properties. It is the main reaction involved in the Roman concrete invented in ancient Rome and used to build, for example, the Pantheon.

The instant, inventive use of PCC is, by contrast, a two-stage process. First, because the raw absorption qualities of the spent lime or PCC are still approximately 65% to 80% reactive, in the presence of the extremely moist drill cuttings, the PCC is allowed to hydrate. Once this occurs, the slurry that results begins a nonpozzolanic hardening process. This hardening is a nucleation process rather than pozzolanic as is the case with fly ash. Nucleation is the first step in the formation of either a new thermodynamic phase or a new structure via self-assembly or self-organization. Nucleation is typically defined to be the process that determines how long an observer has to wait before the new phase or self-organized structure appears. This organization progresses through the formation then breakdown of hydrate coatings. As water is the key to hydration, the rate of reaction is predictable and is controlled by the rate at which water (moist) molecules diffuse through the film, by osmotic action.

A presently preferred embodiment of the method and compound includes selection of volumes of PCC in admixture with a known drying agent selected to achieve a most advantageous state of hydration to allow the nucleation of the PCC in solution to occur to stabilize the cuttings. It is important here to note that while proportions set out herein allow the rapid stabilization of waste water and contaminants, the proportions set out here are not intended to limit this application, but rather to set out a nonlimiting example of the method as it is currently believed to be the optimum mix of reagents.

Referring now to FIG. 1, a preferred embodiment of the present invention commences at a step 102 with the collection and isolation of the PCC by-product in an isolating enclosure. In most instances, the PCC collected will be moist from the precipitation process. By moving this to an enclosure, the process both prevents the collection of additional moisture from the ambient atmosphere (e.g. rain, snow) and allows the PCC to vent by aeration. Generally, this aeration is accomplished by conducting ambient air through a series of weep hole pipes inserted every three feet horizontally symmetric to ground elevation in one exemplary embodiment. Moisture is pulled from the PCC by natural vapor diffusion, the moisture being moved from the PCC by the airflow. Generally, the evaporation can be predicted so that the desired dryness can be achieved in a designated elapsed time, bringing the moisture level to 50%. The preference for the evaporative drying is that it allows production in larger scales without being totally dependent on a wholly mechanical drying system. A production facility can be laid out with aerating weep hole pipes within storage pads for the collected PCC; using evaporatively dried PCC by rotating stock in a circular fashion. The evaporative drying also shortens the subsequent drying intervals in time the dryer is utilized. Because there is no significant external heat introduced, the PCC retains its chemical structure while only reducing its inherent moisture levels.

In a presently preferred embodiment where instead of the use of fly ash, hydrated lime is used to blend with the PCC, heat range maximums were "previously" not exceeding 400 degrees Fahrenheit, yet now those same heat production ranges are only maxing out at 269 degrees Fahrenheit yet drying may occur in under an hour rather than the previous drying times which exceed 2.4 hours and reaching and requiring heat equal to or exceeding 388 degrees Fahrenheit. Interestingly, the use of hydrated lime also produces a much finer product in that the resulting particulate "size" renders the resulting product manageable. The use of hydrated lime facilitations the removal of the laced organics it has enveloped during the beet process.

Thus, the embodiment using 412 pounds of hydrated lime for each ton of raw PCC, the drying or "gestation" time could be increased to 1 hour 44 minutes relative to the previous methods. The collateral benefit of the instant embodiment isolates the non-bio-degradable hydration of waste. The instant embodiment can completely revert back to its previous dry/pulpy/hydrated composition. This reversion can occur within 180 minutes at temperatures above 44 degrees Fahrenheit and even as few as 249 minutes at temperatures of below 27 degrees Fahrenheit. It can be as much as 78% reactive once more in treating even more semi-solid moist waste if the need to do so presents itself.

At a step 104, the evaporatively dried PCC is then mechanically loaded into the dryer/receptacle and dried, preferably without additional heat, thereby to achieve moisture of approximately 10%. Drying can be achieved using heat, though, generally, heat is not necessary and heat usually adds to production costs. Certainly, there is no intent to recalcine the PCC at the much higher temperatures necessary for calcination, merely to dry the PCC. In the preferred embodiment, a circulated forced air flow to speeds the extraction of the moisture in the form of vapor and because there is no additional heat from external sources, the drying airflow is never allowed to exceed a maximum temperature of twice ambient temperature (Importantly, PCC undergoes chemical changes at temperatures above 400° F. that make it less effective and generating such additional heat merely adds undue expense to production). Here, too, the drying rate is known and the time interval necessary to achieve the desired dryness is predictable.

No screening is necessary because the PCC is the product of precipitation and generally made up of small particles. The precipitation process also allows the growing of very fine particles, down to nanometers or hundredths of a micron—much finer than can be obtained by just grinding the limestone rock. PCC's shape and size are different from that of ground calcium carbonate (GCC). Under high magnification, GCC is seen to be irregularly rhombohedral in shape. The PCC crystal shape depends on the product, and the particles are more uniform and regular.

The distribution of particle sizes in a GCC is much broader than for a PCC of the same size—that is, there are many more large particles and many more small particles than in a PCC, and the size of the largest of the particles (the "top size") is much greater for a GCC than for a PCC. The lower top size of a PCC allows the generation of high oil absorptions, useful in certain applications. The importance of obtaining PCC in raw form and driving the moisture level downward to 10% is viewed as of being higher importance or value for the targeted application than selective segregation of particle size. Nucleation does not require that the PCC be of fine particle size.

By way of contrast, if the PCC were to be used for cementitious solidifying or stabilizing, rather than by the instant method, a producer would need to heat dry PCC in excess of 400° F. for extended periods, causing decomposition of the PCC into component compounds. The heating would liberate the laced organics that the PCC had enveloped during the sugaring process. These organics would then be separated and specific material sizes would be discarded based on sieve count. This separation process is essential in the formation of cementitious qualities sought for conventional solidification or stabilization. The expense of this extra processing is neither warranted nor sought in this oil field waste application keeping the expense of stabilization or solidification to a minimum.

At a step 106, the method progresses to introduce to the 10% moisture content PCC a hydrated kiln dust to act as a drying agent. While a 10% moisture content PCC will serve to stabilize, or solidify drill cuttings, the process can be speeded up and the stabilizing effect enhanced by the addition of kiln dust to a achieve a greater drying, thereby allowing less PCC to stabilize a given volume of the cuttings. The mechanical action of mechanically blending (such as in a pug mill) has imparted energy to heat the mixture thereby dissipating still more moisture by evaporative drying. Field results have proven that the mechanical action as well as the additional air exposure drives off more moisture to evaporative drying and enhances the finished product. The addition of hydrated kiln dust, $Ca(OH)2$ with its inherent crystalline silica and magnesium oxide levels enhances the stabilizing PCC effects, especially while also neutralizing the pH it is exposed to in quantities to untreated waters and pH levels that are hazardous to the environment. The kiln dust can also act as a flocculant to aid in the encapsulating action of nucleation. For example, adding effective amounts of PCC can reduce plasticity levels of permeable oil/soils/waste up to 80%, however, the addition of hydrated kiln dust rapidly increases this materials imbalance for more effective results.

Kiln dusts are fine by-products of Portland cement and lime high-temperature rotary kiln production operations and are captured in the air pollution control dust collection system of the Portland cement or of lime producers (e.g., cyclones, electrostatic precipitators, and baghouses). Just as with PCC, kiln dusts are a waste by-product rather than a product produced based upon specific intent to manufacture it. Generally, it is plentiful and inexpensive to obtain.

Cement kiln dust (CKD) is a fine powdery material similar in appearance to Portland cement. Fresh cement kiln dusts can be classified as belonging to one of four categories, depending on the kiln process employed and the degree of separation in the dust collection system. There are two types of cement kiln processes: wet-process kilns, which accept feed materials in a slurry form; and dry-process kilns, which accept feed materials in a dry, ground form. In each type of process the dust can be collected in two ways: (1) a portion of the dust can be separated and returned to the kiln from the dust collection system (e.g., cyclone) closest to the kiln, or (2) the total quantity of dust produced can be recycled or discarded.

The chemical and physical characteristics of CKD that are collected for use outside of the cement production facility will depend in great part on the method of dust collection employed at the facility. Free lime can be found in CKD, and its concentration is typically highest in the coarser particles captured closest to the kiln. Finer particles tend to exhibit higher concentrations of sulfates and alkalis. If the coarser particles are not separated out and returned to the kiln, the total dust will be higher in free lime (since it will contain some coarse particles). CKD from wet-process kilns also tends to be lower in calcium content than dust from dry-process kilns. Approximately 12.9 million metric tons (14.2 million tons) of CKD are produced annually.

Lime kiln dust (LKD) is physically like cement kiln dust, but chemically quite different. LKD can vary chemically depending on whether high-calcium lime (chemical lime, hydrated lime, quicklime) or dolomitic lime is being manufactured.

Fresh LKD can be divided into two categories based on relative reactivity, which is directly related to free lime and free magnesia content. Free lime and magnesia content are most dependent on whether the feedstock employed is calcitic or dolomitic limestone. LKD with a high free lime content IS highly reactive, producing an exothermic reaction upon addition of water. This "quick" LKD is of greatest commercial interest as a direct replacement or substitute for hydrated lime. Approximately 1.8 to 3.6 million metric tons (2 to 4 million tons) of LKD are generated each year in the United States.

In addition to fresh CKD and LKD production, it is estimated that the total amount of kiln dust currently stockpiled throughout the country exceeds close to 90 million metric tons (100 million tons). These stockpiles are usually located relatively close to the cement and lime manufacturing plants, and vary in age and composition, with exposure to the elements (moisture in particular) reducing the chemical reactivity of the dusts.

Both cement and lime kiln dusts have been used independently as stabilizing and solidifying agents in the treatment of soft or wet soils for engineering purposes and for environmental remediation. Both dusts have also been used as pozzolan initiators, as a pelletized lightweight aggregate material, as a mineral filler in asphalt pavements, and as a fill material in earth embankments. Kiln dusts may be obtained directly from Portland cement or hydrated lime producers. Importantly, however, the stabilization or solidification that occurs is strictly a pozzolan reaction producing a cementitious product. Neither kiln dust works as an initiator to nucleation. PCC does that, however.

A method of stabilizing or solidifying drill cuttings commences with, at a step 152, introduction of a blend of PCC and kiln dust to a volume of drill cuttings. There are three basic reactions the instant method exploits in stabilization of or solidifying drill cuttings: cation exchange, flocculation and agglomeration, and lime carbonation reactions. These reactions effected substantial changes in the engineering properties of lime-soil mixtures.

Cation exchange, flocculation, and agglomeration are primarily responsible for the alterations of plasticity, shrinkage, and workability characteristics. Although lime carbonation may contribute slightly to strength increases of the lime-soil mixtures, the nucleation reaction mechanism is regarded as the prime contributor in the instant method.

At a step 154 the blended PCC/kiln dust admixture draws moisture from commixture of drill cuttings and the PCC/kiln dust admixture thereby expanding some 30%. A slight heat is generated in the oxide attachment, in addition to the overall consolidation-flocculation (ion-exchange) of surrounding materials, to act as a type of geosynthetic. The light alkaline-earth oxides (AEOs) form a chemically interesting series of metal oxides. Calcium oxide is the heaviest one in this group of light AEOs and considered to be a purely "ionic" solid. The general order of replaceability of the common cations associated with soils is given by the lyotropic series $Na+ < K+ < Ca++ < Mg++$. Any cation will tend to replace the cations to the left of it, and monovalent cations are usually replaceable by multivalent cations. The addition of lime to drill cuttings supplies an excess of $Ca++$ and cation exchange will occur, with $Ca-++$ replacing dissimilar cations from the exchange complex of the drill cuttings.

At a step 156, the instant method accomplishes the reduction of the drill cuttings, PCC, and kiln dust mixture's exposed plasticity; the energy or heat created at the step 154 improves strength of the now combined materials. This is known as "basic plasticity reduction." Plasticity is the propensity of a material to undergo permanent deformation under load. The characteristics of material by which it undergoes inelastic strain beyond those at the elastic limit is known as plasticity.

At a step 156, the coagulation reaction causes flocculation and agglomeration. The drill cuttings begin by forming a cation, the formation initiating upon exposure to several compounds including calcium hydroxide, crystalline silica, sulfates, phosphates, potassium, sodium, and biodegradable organics (from sugar beets). The addition of lime to drill cuttings causes flocculation and agglomeration of the clay fraction. These reactions result in an apparent change in texture, the clay particles "clumping" together into larger sized "aggregates." The flocculation and agglomeration is effected by the increased electrolyte content of the water the drill cuttings contain and also as a result of ion exchange by the clay to the calcium form. The flocculated structure is stabilized through the rapid formation of tetra-calcium aluminate hydrate cementing agents that bond the flocculated particles.

The influence of cation exchange, flocculation, and agglomeration on the plasticity and shrinkage properties are primarily responsible for the changes in plasticity, shrinkage, and workability characteristics of the drill cuttings, PCC, and kiln dust mixtures. These changes draw together the matrix as results in the cation-exchange of the materials (now combined) in solidification of the oil field waste soils, therefore accelerating the further dehydration of the cuttings.

At a step 158, the lime in the mixture of drill cuttings, PCC, and kiln dust reacts with provided carbon dioxide to form the relatively weak cementing agents: calcium and magnesium carbonate, depending on the type of kiln dust used. The formation of calcium carbonate occurs without introduction of further chemical compounds when lime treated cuttings are cured in the open air. The presence of small amounts of calcium carbonate is a condition conducive to promoting carbonation in the later stabilizing reaction. Under ideal curing conditions 2.5% of $CaCO3$ (by weight) is formed due to the carbonation reaction. Carbonation does produce weak cementing agents. The carbonization at step 158 is a longer-term reaction than the preceding steps 154 and 156. However, the carbonization insures the further stabilization or solidification of the cuttings.

Remembering that the cuttings are treated to reduce the liquid levels of non-biodegradable energy waste to stabilize or solidify the composition into a transportable semi-solid mass, it is often necessary to adjust the PCC and kiln dust mixture to address specific issues. For example, it is not unusual to find that cuttings are not pH neutral or having a pH of 7 (solutions with a pH less than 7 are acidic and solutions with a pH greater than 7 are basic.) Generally, cuttings from deep within the earth (more than three miles, for example) might tend to be much more extreme in pH. Commonly, the muds used in drilling are treated to combat extremes in pH. For example, generally, bicarbonate might be used to address acidity in the cuttings. In a more extreme case, caustic soda. Where the pH is high, citric acid is used to neutralize the mud. The instant mixture of PCC and kiln dust provides a buffering effect in either case in that dissolution of the contained calcium and magnesium oxides provides this buffering effect with carbon dioxide yielding cuttings having a more neutral pH of between 7 and 8. Also because some portion of the drill cuttings include drilling fluids containing permeable solids, these impurities lend a further buffering effect. The instant inventive mixture is effective throughout a broad spectrum of pH levels.

In the commercial embodiment of the invention, blending the kiln dust and PCC preserves and enhances the speed of nucleation due to the fineness of the materials. As blended, the PCC and kiln dust include readily dissolvable quantities of calcium hydroxide, silica, sodium, and pulverized organics from the sugar processing. The presence of each of these components accelerates the formation of these encapsulating coatings, converting the drill cuttings to a more manageable solid state.

In a presently preferred embodiment of the invention, a pugmill is used to blend PCC with one or both of the two kiln dust varieties described herein. A pugmill or pug mill is a machine in which clay or other materials are mixed into a plastic state or a similar machine for the trituration of ore. A pugmill may be a fast, continuous mixer. A continuous pugmill can achieve a thoroughly mixed, homogeneous mixture in a few seconds, and the right machines can be matched to the right application by taking into account the factors of agitation, drive assembly, inlet, discharge, cost and maintenance. A typical pugmill consists of a horizontal boxlike chamber with a top inlet and a bottom discharge at the other end, two shafts with opposing paddles, and a drive assembly. Some of the factors affecting mixing and residence time are the number and the size of the paddles, paddle swing arc, overlap of left and right swing arc, size of mixing chamber, length of pugmill floor, and material being mixed.

Drill cuttings might well include known components used in drilling which can be present without interfering with the encapsulating action of the PCC and kiln dust mixture. For example, to create a heavier mud, barite may be added. Barite is used as a weighting agent for drilling fluids in oil and gas exploration to suppress high formation pressures and prevent blowouts. As a well is drilled, the bit passes through various formations, each with different characteristics. The deeper the hole, the more barite is needed as a percentage of the total mud mix. An additional benefit of barite is that it is non-magnetic and thus does not interfere with magnetic measurements taken in the borehole, either during logging-while-drilling or in separate drill hole logging. Barite is also chemically inert. Its presence in the drill cuttings will not adversely affect the stabilization of the cuttings.

Similarly, the presence of bentonite will not adversely affect the stabilization of the cuttings. Bentonite is used in drilling fluids to lubricate and cool the cutting tools, to remove cuttings, and to help prevent blowouts. Much of bentonite's usefulness in the drilling and geotechnical engineering industry comes from its unique rheological properties. Relatively small quantities of bentonite suspended in water form a viscous, shear-thinning material. Most often, bentonite suspensions are also thixotropic, although rare cases of rheopectic behavior have also been reported. At high enough concentrations (about 60 grams of bentonite per liter of suspension), bentonite suspensions begin to take on the characteristics of a gel (a fluid with a minimum yield strength required to make it move). So, it is a common component of drilling mud used to curtail drilling fluid invasion by its propensity for aiding in the formation of mud cake.

The same nucleation reaction is observed in the presence of Milzan D® Millzan D® is a dispersible, high molecular weight xanthan biopolymer used for rheology control in water-based systems. Millzan D® is used primarily as a viscosifier in fresh water, seawater or saline muds, from low solids to highly weighted systems. Millzan D® is used to minimize friction pressures for additional hydraulic horsepower at the bit for maximum rates of penetration. In the drilling industry, the rate of penetration, is the speed at which a drill bit breaks the rock under it to deepen the borehole.

Where sodium or phosphate treatments are necessary, SAPP (sodium acid pyrophosphate) sticks are commonly used and will not interfere with the nucleation the instant inventive mixture provides. SAPP Sticks are condensate-dispersible, water soluble sticks containing a combination of surfactants, blended with a sodium acid pyrophosphate. SAPP Sticks will perform in the presence of salt, or in fresh water systems.

Still further, where drilling mud is found too viscous for optimal drilling, soap sticks are a common viscosity reducer. Soap sticks in general are designed to foam the water in the tubing, therefore lightening the fluid column and allowing the formation of pressure to unload the fluid from the well. They are usually sold as either a hard stick in a cardboard tube or bag, or a soft stick in gel or a water-soluble tube. Soap sticks do not inhibit the desired nucleation when the PCC and kiln dust mixture are added to the cuttings. That such nucleation can occur in the presence of a common mud additive is extremely advantageous.

Soltex® Additive is a sodium asphalt sulfonate made water soluble by a unique sulfonation process. It is a versatile, total mud conditioner that stabilizes shale formations, significantly increases lubricity, lowers high temperature high pressure fluid loss, water loss, and enhances filter cake properties in both oil and water-based drilling fluids. The product can be mixed in most water-based and all oil-based and synthetic muds. The presence of the Soltex® Additive in the recovered drill cuttings also does not inhibit nucleation.

Desco CF® is a reddish-brown, tannin-type mud thinner designed to reduce the viscosity and gels of most water-based muds. Desco CF® is particularly used in an elevated pH or high chloride environment. Being a polyphenolic-type material, it also acts as a corrosion inhibitor by removing dissolved oxygen from the mud. Desco CF® acts to thin freshwater, seawater, and brine water mud systems. Again, the presence of Desco CF® does not inhibit stabilization with PCC and kiln dust.

While the PCC and kiln dust admixture is effective across a wide range of proportions, experimentation has shown that the mixture reaches its optimum absorption level where the exact nature of the cuttings is not known but in most instances can yield serviceable results with an approximate ratio of 70% PCC mixed with 30% kiln hydrate. In such a proportion, 1 kg (2.205 lbs.) of such a mixture absorbs 0.32 kg (11.29 oz.) of water through a hydration reaction. Put another way, an initial water/moisture content of 60% would be reduced to 31% if the treated materials include the addition of the PCC kiln dust admixture equivalent to 20% of the dry mass of the resulting drill cuttings or oil field waste.

The exact proportion of the PCC kiln dust admixture varies due to variation in the content of the drill cuttings. The mean density of earth-loam-dry-excavated is generally accepted to be about 90 lbs./ft.3 whereas the mean density of excavated moist earth is about 108 lbs./ft.3. By contrast, crude oil is about 55 lbs./ft.3, which density is significant enough to drive a need for a distinct calculation of the optimum application of the PCC kiln dust admixture to a volume of drill cuttings. Given this variability in content, the absorption process will require distinct formulations of the admixture of kiln dust and PCC based upon the presence of each of water and oil components. The resulting cuttings stabilized by the PCC and kiln dust achieve the removal of free liquid fraction of the liquid drill waste and reserve pit fluids from a plus 70% liquid limit to less than 15% moisture level.

FIG. 3 depicts a table (Table 1) that yields the presently preferred quantity of the PCC kiln dust admixture to stabilize to stabilize cuttings. This presently preferred quanitity is determined based upon recent field testing and may be further refined with experience. For example, where cuttings contain no crude but 30% water, the recommended quantity of the admixture is 1.5 pounds per gallon of cuttings. At 50% moisture content, the recommended quantity is the increased amount of 2.2 pounds per gallon of cuttings.

In a similar manner, the PCC kiln dust admixture can be appropriately tailored to the precise makeup of the cuttings. FIG. 4 (Table 2) depicts proportions of PCC to kiln dust (herein identified as High Cal which is a commercial name for the kiln dust). So, for example, where the cuttings do not contain crude oil and have a moisture content of 50%, the optimal proportions in the admixture are to use 80% PCC and 20% kiln dust to stabilize the cuttings. Where crude is present as 40% of the content of the cuttings, an 80/20 mixture is most efficacious.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for composing an admixture for stabilization of drill cuttings comprises:
   providing precipitated calcium carbonate (PCC), a synthetically formed $CaCO_3$;
   drying the PCC to a moisture level of about 10% or less; and
   blending the dried PCC with hydrated lime, also known as calcium hydroxide $\{Ca(OH)_2\}$, to compose a generally uniform admixture, the hydrated lime, not to exceed 50%.

2. The method of claim 1 wherein drying the PCC includes:
   packaging the admixture to exclude introduction of moisture prior to application on drill cuttings.

3. The method of claim 1, wherein drying the PCC includes:
   drying in a mechanical dryer at a temperature not to exceed 400° F.

4. The method of claim 1, wherein blending the dried PCC with hydrated lime includes:
   blending by means of a pugmill.

5. The method of claim 1, wherein blending the dried PCC with hydrated lime includes selecting a ratio of dried PCC to hydrated lime based upon a moisture level in the drill cuttings to be stabilized.

6. The method of claim 1, wherein blending the dried PCC with hydrated lime includes selecting a ratio of dried PCC to hydrated lime based upon a crude oil content in the drill cuttings to be stabilized.

7. The method of claim 1, wherein blending the dried PCC with hydrated lime includes selecting an amount of dried PCC to hydrated lime based upon a moisture level in the drill cuttings to be stabilized.

8. The method of claim 1, wherein blending the dried PCC with hydrated lime includes selecting an amount of dried PCC to hydrated lime based upon a crude oil content in the drill cuttings to be stabilized.

9. A method for stabilizing drill cuttings comprises:
   providing precipitated calcium carbonate (PCC);
   drying the PCC to a moisture level of about 10% or less;
   blending the dried PCC with hydrated lime, also known as calcium hydroxide $\{Ca(OH)_2\}$, to compose a generally uniform admixture, the hydrated lime not to exceed 50%; and
   introducing the generally uniform admixture to the drill cuttings to initiate a nucleation reaction within the blend of drill cuttings and the admixture.

10. The method of claim 9 wherein drying the PCC includes:
    packaging the admixture to exclude introduction of moisture prior to application on drill cuttings.

11. The method of claim 9, wherein drying the PCC includes:
    drying in a mechanical dryer at a temperature not to exceed 400° F.

12. The method of claim 9, wherein blending the dried PCC with hydrated lime includes:
    blending by means of a pugmill.

13. The method of claim 9, wherein blending the dried PCC with kiln dust includes selecting a ratio of dried PCC to hydrated lime based upon a moisture level in the drill cuttings to be stabilized.

14. The method of claim 9, wherein blending the dried PCC with hydrated lime includes selecting a ratio of dried PCC to hydrated lime based upon a crude oil content in the drill cuttings to be stabilized.

15. The method of claim 9, wherein blending the dried PCC with hydrated lime includes selecting an amount of dried PCC to hydrated lime based upon a moisture level in the drill cuttings to be stabilized.

16. The method of claim 9, wherein blending the dried PCC with hydrated lime includes selecting an amount of dried PCC to hydrated lime based upon a crude oil content in the drill cuttings to be stabilized.

* * * * *